US008584038B2

(12) United States Patent
de los Reyes et al.

(10) Patent No.: US 8,584,038 B2
(45) Date of Patent: Nov. 12, 2013

(54) TECHNIQUES FOR USE WITH A CALENDAR AND MESSAGING COMPONENT

(75) Inventors: August de los Reyes, Bellevue, WA (US); Adrian Mark Chandley, Sammamish, WA (US); Paul E. Henderson, Redmond, WA (US); Allen Sayegh, Redmond, WA (US); Edith Ackermann, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1080 days.

(21) Appl. No.: 11/640,597

(22) Filed: Dec. 18, 2006

(65) Prior Publication Data

US 2008/0148181 A1    Jun. 19, 2008

(51) Int. Cl.
*G06F 3/048*    (2013.01)

(52) U.S. Cl.
USPC .......................... 715/801; 715/963; 715/781

(58) Field of Classification Search
USPC ......................................... 715/781, 801, 963
See application file for complete search history.

(56) References Cited

U.S. PATENT DOCUMENTS

| | | | | |
|---|---|---|---|---|
| 5,528,745 | A * | 6/1996 | King et al. | 715/753 |
| 5,874,965 | A * | 2/1999 | Takai et al. | 345/667 |
| 5,936,625 | A * | 8/1999 | Kahl et al. | 715/775 |
| 6,735,596 | B2 | 5/2004 | Corynen | |
| 6,958,759 | B2 | 10/2005 | Safadi et al. | |
| 6,966,033 | B1 | 11/2005 | Gasser et al. | |
| 7,075,512 | B1 | 7/2006 | Fabre et al. | |
| 7,584,253 | B2 * | 9/2009 | Curbow et al. | 709/206 |
| 2002/0196280 | A1 * | 12/2002 | Bassett et al. | 345/751 |
| 2003/0088714 | A1 | 5/2003 | Madlener et al. | |
| 2003/0103023 | A1 * | 6/2003 | Ootsuka et al. | 345/87 |
| 2004/0103167 | A1 | 5/2004 | Grooters et al. | |
| 2005/0005249 | A1 * | 1/2005 | Hill et al. | 715/963 |
| 2005/0198612 | A1 | 9/2005 | Gonzalez | |
| 2006/0080342 | A1 * | 4/2006 | Takaki | 707/100 |
| 2006/0129931 | A1 | 6/2006 | Simons et al. | |
| 2007/0168892 | A1 * | 7/2007 | Brush et al. | 715/963 |
| 2007/0233736 | A1 * | 10/2007 | Xiong et al. | 707/104.1 |
| 2008/0174570 | A1 * | 7/2008 | Jobs et al. | 345/173 |
| 2009/0100347 | A1 * | 4/2009 | Schemers et al. | 715/751 |

FOREIGN PATENT DOCUMENTS

WO    WO2005107409 A3    11/2005

OTHER PUBLICATIONS

"HP iPAQ Pocket PC solutions", Date: Aug. 2005, http://h20195.www2.hp.com/v2/pdf/5983-2619EEE.pdf#search=%22integration%20HP%20photosmart%20calendar%20messaging%20single%20user%20interface%22.

Hill, et al., "An Application Framework and Intelligent Graphic User Interface for Multiple Accelerator Codes", http://www.ghga.com/accelsoft/techpapers/multacccode.pdf#search=%22single%20user%20interface%20multiple%20application%22.

Storey, et al., "On Integrating Visualization Techniques for Effective Software Exploration", http://www.cs.uvic.ca/~mstorey/papers/infovis97.pdf#search=%22user%20interface%20multiple%20task%20area%20dragging%20zoom%22.

* cited by examiner

*Primary Examiner* — Andrea Leggett
(74) *Attorney, Agent, or Firm* — Microsoft Corporation

(57) ABSTRACT

Techniques are provided for displaying electronic calendar information. A calendar entry corresponding to a date is selected. In response to selecting the calendar entry, the calendar entry is expanded by increasing a portion of a display area associated with the calendar entry. Other calendar entries are compressed by decreasing a portion of the display area associated with the other calendar entries.

20 Claims, 15 Drawing Sheets

FIG. 8

|  |  | W | Th | F | Sa |
|---|---|---|---|---|---|
| OCTOBER | | | | | |
| NOVEMBER | | | | | |
| S | M | T | | | |
| 1 | 2 | 3 | 4 | 5 | 6 | 7 |
| 8 | 9 | 10 | 11 | 12 | 13 | 14 |
| 15 | 16 | 17 | 18 | 19 | 20 | 21 |
| | | | A1 A2 X2 A3 X1 A4 | | | |
| 22 | 23 | 24 | 25 | 26 | 27 | 28 |
| 29 | 30 | 31 | | | | |
| DECEMBER | | | | | | ↓ |

| | | S | M | T | W | Th | F | Sa |
|---|---|---|---|---|---|---|---|---|
| OCTOBER | | | | | | | | |
| NOVEMBER | | | | | | | | |
| | | | | | | | | |
| | | | 1 | 2 | 3 | 4 | 5 | 6 | 7 |
| | | 8 | 9 | 10 | 11 | 12 | 13 | 14 |
| | | 15 | 16 | 17 | 18 | 19 | 20 | 21 |
| | | | | | | | | |
| | | 22 | 23 | 24 | 25 | 26 | 27 | 28 |
| | | 29 | 30 | 31 | | | | |
| DECEMBER | | | | | | | | |

550, 552, 554, X2

| | | S | M | T | W | Th | F | Sa |
|---|---|---|---|---|---|---|---|---|
| OCTOBER | | | | | | | | |
| NOVEMBER | | | | | | | | |
| | | | | 1 | 2 | 3 | 4 | 5 | 6 | 7 |
| | | 8 | 9 | 10 | 11 | 12 | 13 | 14 |
| | | 15 | 16 | 17 | 18 | 19 | 20 | 21 |
| | | 22 | 23 | 24 | 25 | 26 | 27 | 28 |
| | | 29 | 30 | 31 | | | | |
| DECEMBER | | | | | | | | |

FIG. 9C

|  | S | M | T | W | Th | F | Sa |
|---|---|---|---|---|---|---|---|
| OCTOBER | | | | | | | |
| NOVEMBER | | | | | | | |
| | 1 | 2 | 3 | 4 | 5 | 6 | 7 |
| | 8 | 9 | 10 | 11 | 12 | 13 | 14 |
| | 15 | 16 | 17 | 18 | 19 | 20 | 21 |
| | | | 24 X2 | | | | |
| | 22 | 23 | | 25 | 26 | 27 | 28 |
| | 29 | 30 | 31 | | | | |
| DECEMBER | | | | | | | |

FIG. 9D

|   |   | W | Th | F | Sa |
|---|---|---|----|---|----|
| OCTOBER | | | | | |
| NOVEMBER | | | | | |
| S | M | T | W | Th | F | Sa |
| | | | 4 | 5 | 6 | 7 |
| 1 | 2 | 3 | | | | |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 | | | | |
| DECEMBER | | | | | |

TECHNIQUES FOR USE WITH A CALENDAR AND MESSAGING COMPONENT

BACKGROUND

Existing programs which perform electronic messaging and maintaining an electronic calendar for appointments include a separate messaging mode and a separate calendar mode. One drawback with such existing programs is that the foregoing two modes may operate mutually exclusive of one another. Thus, a user may not be able to simultaneously view his/her calendar while also being able to perform electronic messaging functionality. The user also changes between the two modes in order to use the different functionality associated with each mode. Additionally, such existing programs having the foregoing two modes do not provide a user interface with integrated information regarding electronic messages and a user's calendar.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques are provided for displaying electronic calendar information. A selected calendar entry is expanded by increasing a portion of a display area associated with the calendar entry while other calendar entries are compressed. The electronic calendar information may be included in an display integrated with a message area for using messages with an electronic calendar.

DESCRIPTION OF THE DRAWINGS

Features and advantages of the present invention will become more apparent from the following detailed description of exemplary embodiments thereof taken in conjunction with the accompanying drawings in which:

FIGS. 8, and 9A-9F are examples illustrating calendar displays using the techniques herein.

DETAILED DESCRIPTION

Figure 1:
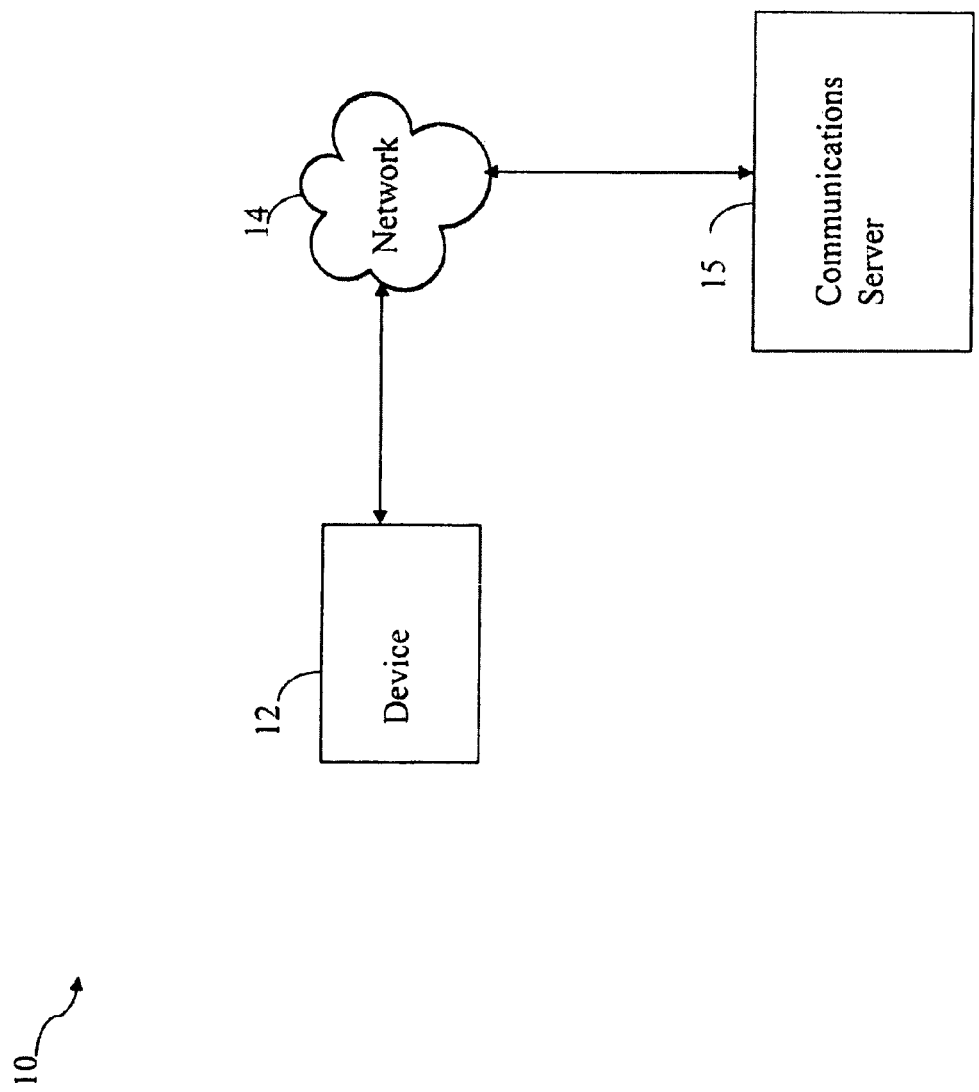
FIG. 1 is an example of an embodiment illustrating an environment that may be utilized in connection with the techniques described herein.

Referring now to FIG. 1, illustrated is an example of a suitable computing environment in which embodiments utilizing the techniques described herein may be implemented. The computing environment illustrated in FIG. 1 is only one example of a suitable computing environment and is not intended to suggest any limitation as to the scope of use or functionality of the techniques described herein in connection with an electronic calendar and messaging component and various user interface examples included herein. Those skilled in the art will appreciate that the techniques described herein may be suitable for use with other general purpose and specialized purpose computing environments and configurations. Examples of well known computing systems, environments, and/or configurations include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The techniques set forth herein may be described in the general context of computer-executable instructions, such as program modules, executed by one or more computers or other devices. Generally, program modules include routines, programs, objects, components, data structures, and the like, that perform particular tasks or implement particular abstract data types. Typically the functionality of the program modules may be combined or distributed as desired in various embodiments.

Included in FIG. 1 are a device 12, a network 14, and a communications server 15. The device 12 may be, for example, a computer having a display or output device such as a personal or desk top computer. The device 12 included in FIG. 1 is exemplary for purposes of illustrating the techniques described herein in connection with an electronic calendar and messaging component. Any device that has connectivity to the server 15 and having the functionality described herein may be included in an embodiment. The device 12 may include a processor used to execute code included in one or more program modules. Described in more detail elsewhere herein are program modules that may be executed by the device 12 in connection with the techniques described herein. The device 12 may operate in a networked environment and communicate with the communications server 15 and other computers not shown in FIG. 1. As described herein, the device 12 may be a personal computer. In other embodiments, the functionality of device 12, or the device 12 itself, may be included in another component in accordance with a particular environment in which the device 12 is utilized. For example, one environment in which the device 12 may be used is in a household environment. The device 12 may be included, for example, in a home appliance such as a refrigerator having a display area as an output for the various interfaces described herein. It should also be noted that the techniques and functionality described herein associated with device 12 may be integrated into the household appliance or other component for use in a particular environment.

The communications server 15 may be used in connection with processing and routing communications to devices such as the device 12 connected to the network 14. In one embodiment, information regarding communications may be stored at the communications server and retrieved for use by the device 12, and possibly other devices, having connectivity to the server 15.

It will be appreciated by those skilled in the art that although the device 12 is shown in the example as communicating in a networked environment, the device 12 may communicate with other components utilizing different communication mediums. For example, the device 12 may communicate with one or more components utilizing a network connection, and/or other type of link known in the art including, but not limited to, the Internet, an intranet, or other wireless and/or hardwired connection(s).

It should also be noted that although the device 12 is illustrated as having connectivity to a communications server 15, the techniques described herein may be used in connection with a device 12 operating standalone without external connection to a server. For example, the device 12 may be included in a household appliance such as refrigerator with an output display area on the door of the refrigerator. The appliance may not operate as part of network with a communications server.

Figure 2:
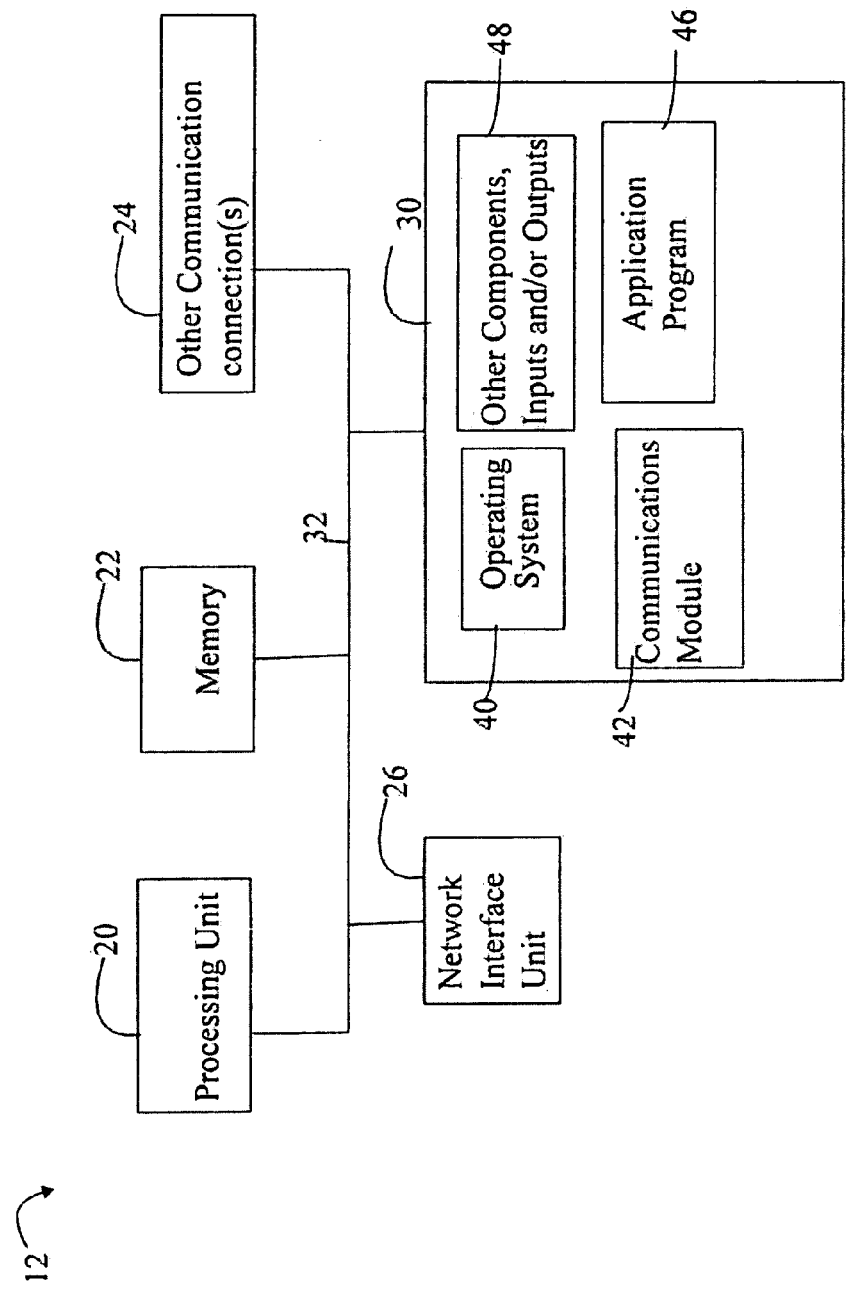
FIG. 2 is an example of components that may be included in an embodiment of a device for use in connection with performing the techniques described herein.

Referring now to FIG. 2, shown is an example of components that may be included in the device 12 as may be used in connection with performing the various embodiments of the techniques described herein. The device 12 may include one or more processing units 20, memory 22, a network interface unit 26, storage 30, one or more other communication connections 24, and a system bus 32 used to facilitate communications between the components of the device 12.

Depending on the configuration and type of user device 12, memory 22 may be volatile (such as RAM), non-volatile (such as ROM, flash memory, etc.) or some combination of the two. Additionally, the device 12 may also have additional features/functionality. For example, the device 12 may also include additional storage (removable and/or non-removable) including, but not limited to, USB devices, magnetic or optical disks, or tape. Such additional storage is illustrated in FIG. 2 by storage 30. The storage 30 of FIG. 2 may include one or more removable and non-removable storage devices having associated computer-readable media that may be utilized by the device 12. The storage 30 in one embodiment may be a mass-storage device with associated computer-readable media providing non-volatile storage for the device 12. Although the description of computer-readable media as illustrated in this example may refer to a mass storage device, such as a hard disk or CD-ROM drive, it will be appreciated by those skilled in the art that the computer-readable media can be any available media that can be accessed by the device 12.

By way of example, and not limitation, computer readable media may comprise computer storage media and communication media. Memory 22, as well as storage 30, are examples of computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by device 12. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The device 12 may also contain communications connection(s) 24 that allow the computer to communicate with other devices and components such as, by way of example, input devices and output devices. Input devices may include, for example, a keyboard, mouse, pen, voice input device, touch input device, etc. Output device(s) may include, for example, a display, speakers, printer, and the like. These and other devices are well known in the art and need not be discussed at length here. The one or more communications connection(s) 24 are an example of communication media. In one embodiment, the device 12 may be connected to a touchscreen display as a user interface. As known in the art, a user selection may be made using a touchscreen device by touching a location on the screen or display surface. The foregoing may be used, for example, as an alternative to obtaining user input with another input device such as a mouse, keyboard, and the like. The techniques herein may be used in an embodiment which utilizes a touchscreen as well as other input devices.

In one embodiment, the device 12 may operate in a networked environment as illustrated in FIG. 1 using logical connections to remote computers through a network. The device 12 may connect to the network 14 of FIG. 1 through a network interface unit 26 connected to bus 32. The network interface unit 26 may also be utilized in connection with other types of networks and/or remote systems and components.

One or more program modules and/or data files may be included in storage 30. During operation of the device 12, one or more of these elements included in the storage 30 may also reside in a portion of memory 22, such as, for example, RAM for controlling the operation of the user computer 12. The example of FIG. 2 illustrates various components including an operating system 40, a communications module 42, one or more application programs 46, and other components, inputs, and/or outputs 48. In one embodiment, the application program 46 may be an electronic calendar and messaging component. As will be described herein, the electronic calendar and messaging component may include functionality for maintaining an electronic appointment calendar for users as well as messaging functionality providing for electronic message exchanges between users. In one embodiment the electronic calendar and messaging component included in the device 12 may utilize a touchsceen. The device 12 may be included in a household appliance, such as a refrigerator, for use in facilitating communications between household members and others outside of the household.

The operating system 40 may be any one of a variety of commercially available or proprietary operating systems. The operating system 40, for example, may be loaded into memory in connection with controlling operation of the user computer. One or more application programs 46 may execute in the device 12 in connection with performing user tasks and operations.

The communications module 42 may be used in connection with processing a user's inputs and selection as may be manually input through a component of the device 12, such as a using a touchscreen. The communications module 42 may also facilitate communications between components of the device 12, such as from the electronic calendar and messaging component, and the communication server 15. For example, the communications module 42 may be used in connection with receiving information from the communications server 15 for display and use by the device 12.

It should be noted that any one of a variety of different techniques may be used to communicate the information to/from the communications server. For example, information input at the device 12 may be pushed from the device 12 to the communications server 15. It will be appreciated by those skilled in the art that other techniques, such as pulling information from the device 12, polling, and the like, may also be used.

Figure 3:
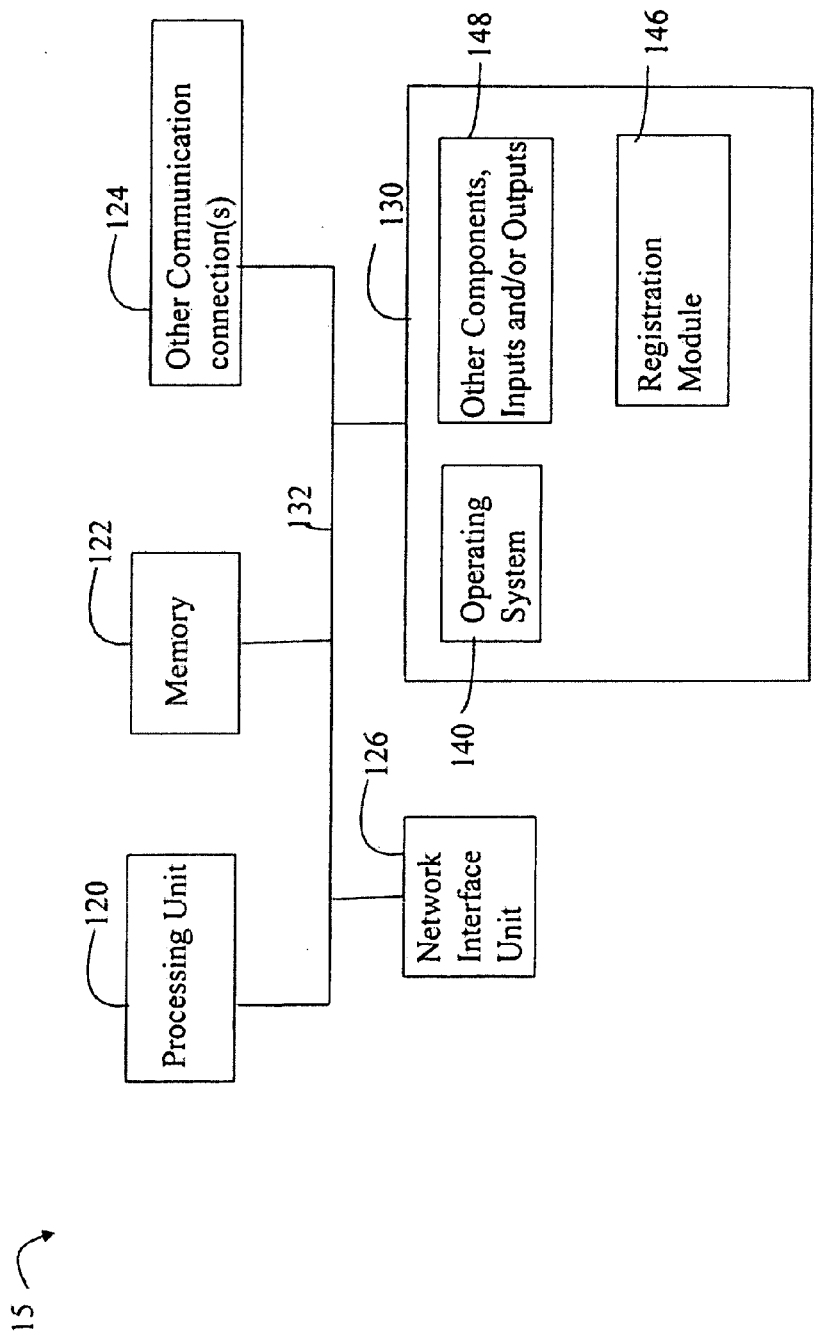
FIG. 3 is an example of components that may be included in an embodiment of a communications server for use in connection with performing the techniques described herein.

Referring now to FIG. 3, shown is an example of components that may be included in the communications server 15 and used in connection with performing the various embodiments of the techniques described herein. As illustrated in FIG. 3, an embodiment of the communications server 15 may include components similar to those described in connection with FIG. 2. Additionally, the communications server 15 may include a registration module 146 for registering one or more users of the communications server. In one embodiment, one or more users located within a household may be registered. In connection with techniques herein, each user may have an electronic email account, a calendar, and the like. Information for each of the foregoing may be maintained at the communications server 15 and transferred to the device 12. Similarly, information input at device 12 may be transferred to the communications server 15 using the techniques herein. For example, the device 12 may be executing code of the electronic messaging and calendar component. Incoming communications for a user may be routed via the communications server to the user and displayed, for example, on the output display of device 12. Outgoing communications, for example, from a user of device 12 may be routed to the communications server to one or more other users.

The registration module 146 may be used in connection with registration of a user. As part of the registration process, the user may be assigned a user identifier, an associated email account, and the like.

Figure 4:
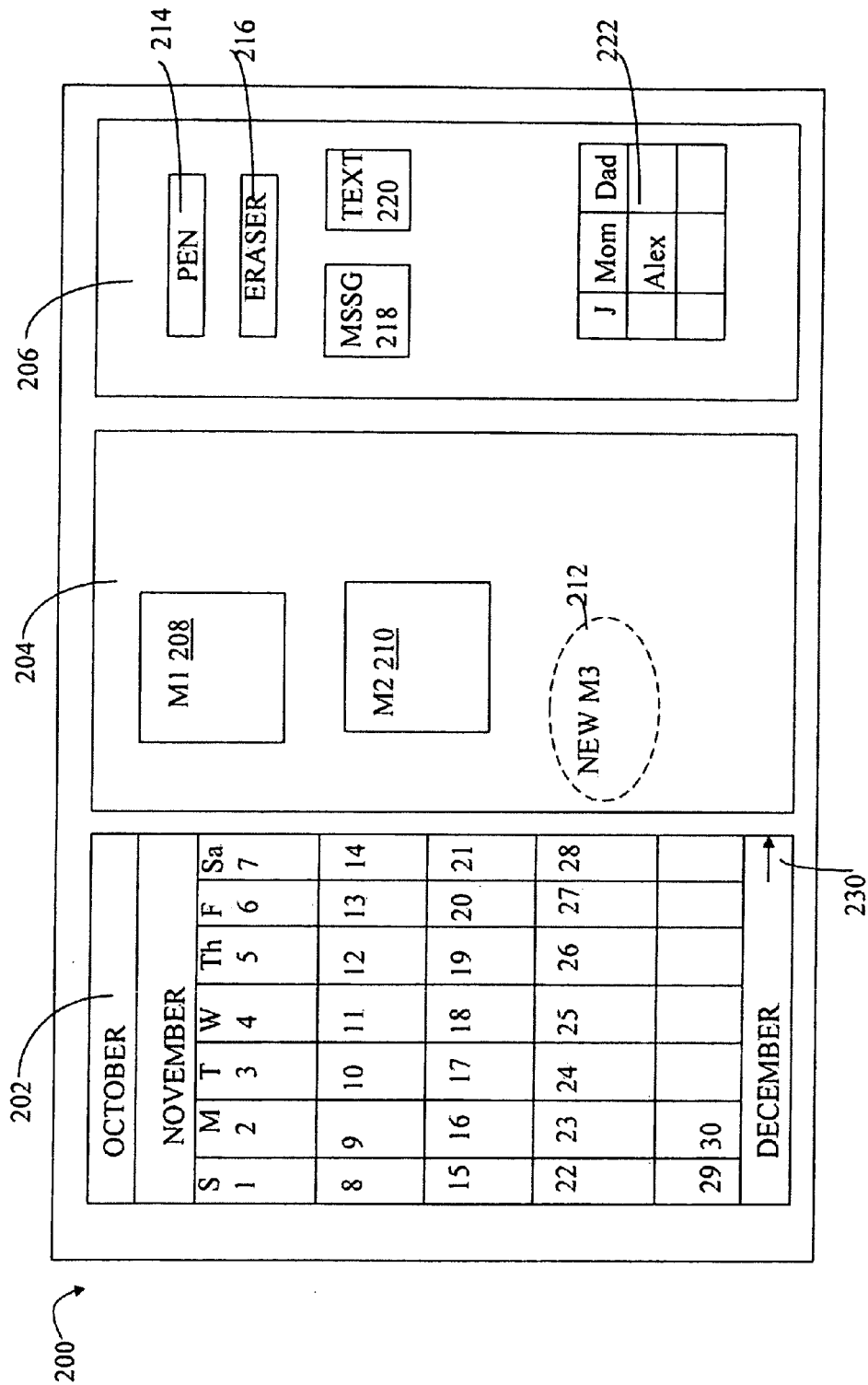
FIGS. 4-7 are examples illustrating different screen displays using the techniques herein.

Referring now to FIG. 4, shown is an example of a screen display that may be included on an output area of device 12. The example 200 includes a calendar display area 202, a message display area 204 and another area 206 including various menu options and controls. The area 202 includes a graphical display of a calendar having corresponding entries for days of the indicated month. In this example, the calendar in 202 may be characterized as being in a compressed view form. As will be explained in more detail in following paragraphs and figures, the compressed view may be expanded into an expanded calendar view by selecting 230.

The area 204 includes one or more messages corresponding to message events. In one embodiment, the area 204 may include messages for one or more users of the device 12. In one embodiment in which the device 12 may be used by members of a household, each household member may be registered user of the device. The various household members may be indicated in grid portion 222 by a separate grid location. The messages included in 204 may be messages for a selected user indicated in 222. Selection of an element from 222 may cause portion 204 to be updated with additional messages in accordance with the selection. In this example, area 204 includes two messages 208 and 210. Additionally, area 204 includes a text portion 212 which may not be included in a message. In one embodiment, a user may enter text on the screen by selecting the pen 214 from area 206. The user may also perform other operations such as erase text using 216. Elements 218 and 220 may correspond to buttons for performing different operations. Element 218 may be selected to create a new message. Button 220 may be selected to identify a portion of the display 200 having text which is included in a message. For example, button 220 may be selected and a user may mark a portion of the screen, such as indicated by the circular portion 212, including text which is copied into a newly created message.

The example 200 illustrates an interface in which a message may be created in two ways. A message may be created via selection of button 218 which causes display of a new message note interface as illustrated, for example, in FIG. 5. A message may also be created using text included on the screen, such as area 204, using the text selection button 220 to select text from the display and include the text in a new message which is then displayed in area 204.

A message from area 204 may be associated with a particular date on the calendar by selecting the message, dragging the selected message over an entry of the calendar in 202, and dropping the message in the entry of calendar. In response to dropping a message on a calendar entry, the calendar entry may be highlighted indicating the calendar entry as the currently selected or active entry. The message may appear as a small icon in the calendar entry. Additionally, the display may be updated to zoom in or expand the selected calendar entry into which the message is dropped. This zoom-in response feature is illustrated and described in more detail in connection with FIG. 7. It should be noted that a particular calendar entry may also be selected or made active using other techniques besides the foregoing message drag and drop technique. For example, a calendar entry in region 202 may be selected using an input device such as mouse, a touchscreen, and the like. In response to selection of a calendar entry either using the drag and drop technique or by direct selection using an input device, the selected calendar entry may be expanded as will be described in more detail in following paragraphs and figures.

The calendar of 202 may operate in a first mode and only include calendar information for selected users in accordance with which one or more buttons of 222 are selected. In another mode, the calendar may include calendar information for all users indicated by the buttons of 222. However, if one or more buttons of 222 are selected at a point in time, the calendar information for the users corresponding to the selected buttons may be visually indicated or differentiated from other calendar information. Such visual indication may be made, for example, by highlighting, bolding, and the like. In one embodiment, the calendar portion 202 may include calendar information, such as appointments, messages associated with dates, and the like.

Message area 204 may include messages for one or more selected users in accordance with which one or more buttons of 222 are selected. In an embodiment, the area 204 may alternatively include messages for all users indicated by the buttons of 222. However, if particular buttons from 222 are selected, messages for those users corresponding to the selected buttons may be highlighted or otherwise visually indicated in area 204.

In one embodiment, the example 200 may be displayed on a device utilizing a touchscreen. As such, a user may make a selection by touching the screen in a particular location. Such selection may be made as an alternative to using another input device, such as a mouse, pen, and the like.

Figure 5:
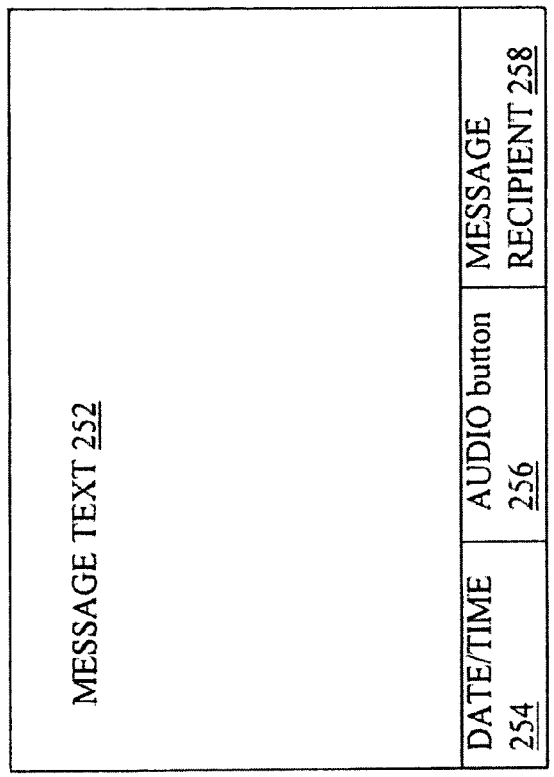

Referring now to FIG. 5, shown is an example of a message in more detail. When a new message is created, a new element such as in the shape of the rectangle of 250, may be drawn in area 204 of a screen display. A message may include a text portion 252, date/time information 254, audio information 256, and a message recipient portion 258. The new message of 250 may be displayed in area 204 of FIG. 4, for example, in response to selecting button 218 of FIG. 4. The message text 252 as well as other information of the new message may be entered. In one embodiment, selection of button 220 of FIG. 4 may also result in the creation of a new message 250 in which the selected text is included in the message text portion 252. The audio information associated with 256 may be a voice or other sound recording associated with the message event represented by 250. An embodiment may include a device 12 having the components which are capable of making a sound recording. The sound recording may then be linked to the message 250 as represented by 256.

A message may be an electronic communication corresponding to any one of a variety of different events or element such as, for example, a list, a reminder, an invitation, and the like, in any one or more forms including text, audio, and/or image information.

It should be noted that an embodiment may include different information for a message than as described herein. For example, a message may also include image information.

What will now be described are various behaviors that may be associated with the calendar portion 202 in connection with techniques herein while managing messages and a calendar.

Figure 6:
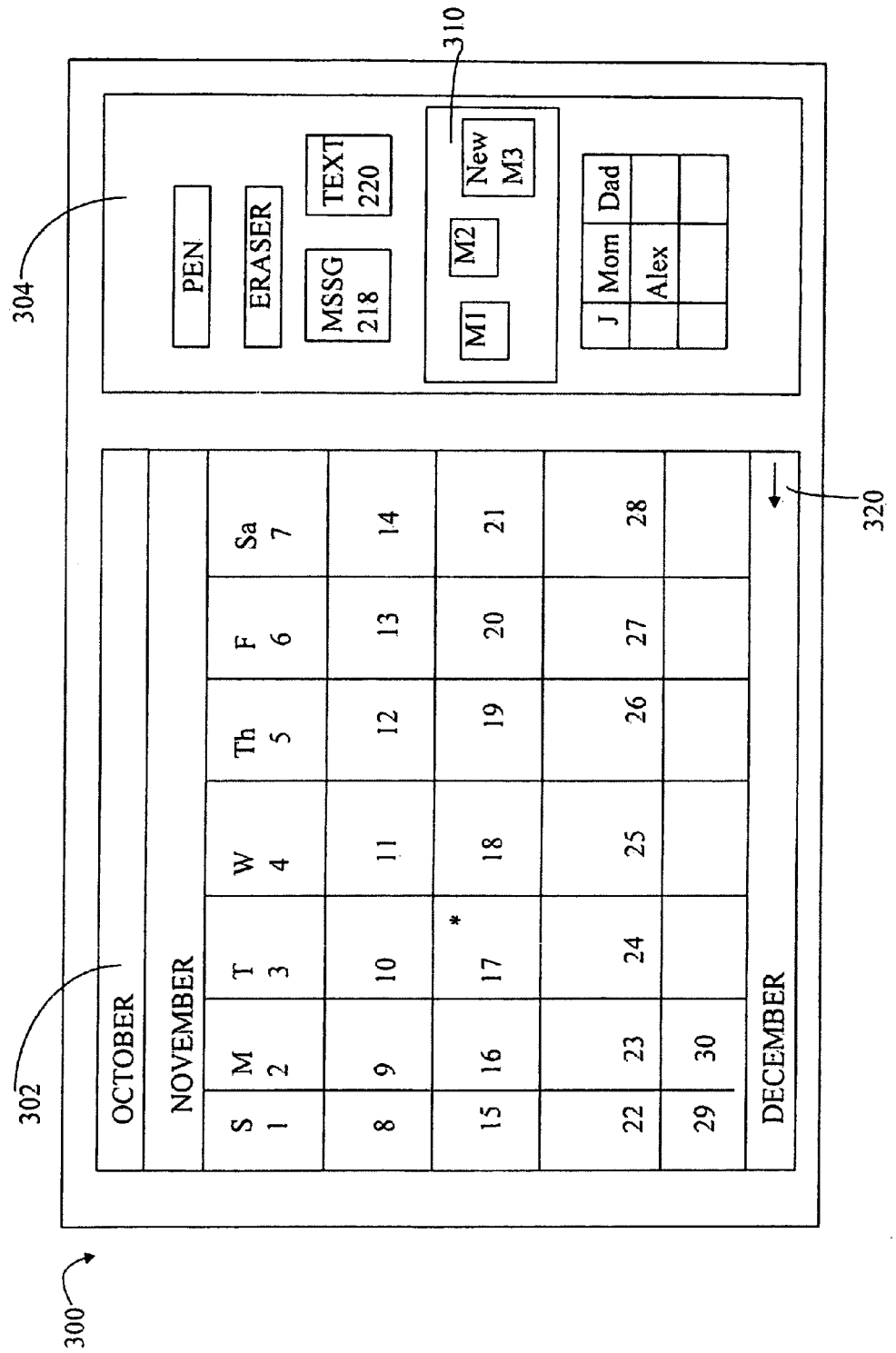

Referring now to FIG. 6, shown is an example of a screen that may be displayed in response to selection of the button 230 of FIG. 4 causing the calendar portion 202 to be expanded. The example 300 includes an expanded calendar view 302 and an area 304 including various menu options and controls. In the example 300, it should be noted that the message area is included in a compressed view form 310. This is in contrast, for example, to the message display area 204 of FIG. 4 which may be characterized as an expanded view of the message area. A user may select to view the calendar portion 302 in the compressed view by selecting button 320.

In connection with techniques described herein, when the calendar portion is in an expanded view form as illustrated in FIG. 6, the message area may be in a compressed view form as in 310. When the calendar portion is in a compressed view form as previously illustrated in FIG. 4, the message area may be in an expanded view form.

When the calendar portion 302 is in an expanded view form, an entry of the calendar of 302 may be selected in one of the two ways as previously described in connection with the compressed view form of the calendar. A calendar entry may be selected using a first drag and drop technique for dragging and dropping a message from 310 onto a selected calendar entry. Using a second technique, a selection of the calendar entry may be made, for example, using a touch-screen or other input device to directly select the corresponding portion of a screen for the calendar entry. Using either of the foregoing techniques from either the expanded calendar view form of FIG. 6 or the compressed calendar view form of FIG. 4, processing is performed to zoom-in or expand a view for the selected calendar entry as will be illustrated in FIG. 7.

Figure 7:
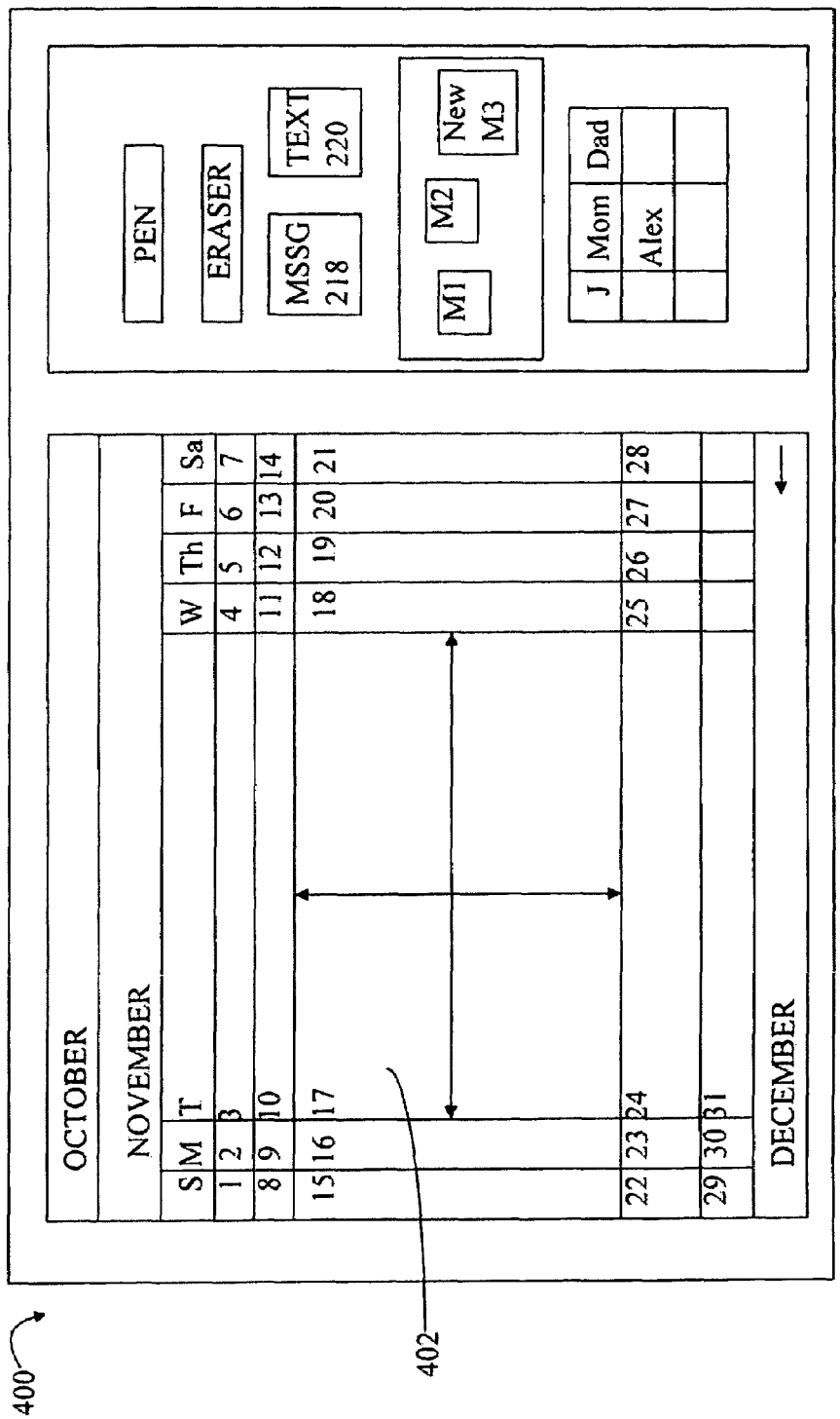

Referring now to FIG. 7, shown is an example of a screen that may be displayed in connection with expanding a view for the selected calendar entry. The example 400 may be displayed in response to selection of a particular calendar entry as described above. In this example, the calendar entry selected is November 17$^{th}$. The calendar entry, for which expanded view processing is performed as illustrated in FIG. 7, may be selected either by dragging and dropping a message on the calendar entry, directly selecting the entry using an input device, as well as other techniques. The selection of a calendar entry may be performed when the calendar is in either the expanded of compressed view form.

In response to selecting a calendar entry, processing is performed to provide an expanded or zoom-in view of the calendar entry. In one embodiment, the selected calendar entry is expanded and the other remaining calendar entries for the month are compressed. An embodiment may perform compression of other calendar entries in the vertical and horizontal directions (e.g., above, below, to the left of, and to the right of) with respect to the selected calendar entry in any order. For example, an embodiment may first compress calendar entries above a selected entry and expand the selected entry by an amount in the upward direction. In a second processing step, calendar entries below the selected calendar entry may be compressed and the selected entry may be expanded by an amount in the downward direction. Similarly, calendar entries to the left and to the right of the selected calendar entry may be compressed, respectively, in a third processing step and a fourth processing step. The display may be updated as each processing step is performed. An embodiment may also perform the foregoing steps in a different sequential ordering. An embodiment may also perform two or more of the foregoing processing steps at a time, or otherwise update the display after performing two or more of the foregoing processing steps.

The compression of calendar entries in a particular direction (e.g., above, below, to the left of, or to the right of) with respect to the selected calendar entry may be performed by compressing all rows or columns of the particular direction at once, processing each row or column sequentially, or otherwise compressing multiple rows or columns at a time. For example, with respect to the selected entry 402, November 17$^{th}$, two rows of entries above are compressed, four columns to the right are compressed, two rows below are compressed, and two columns to the left are compressed. For each of the four directions, all rows or columns of entries of one direction may be compressed at the same time, one row or column at a time, or in some other grouping. For example, with respect to the four columns to the right of 402, all four columns of entries may be compressed at once and the display accordingly updated. In a variation of the foregoing, each of the four columns may be compressed one at a time beginning with the rightmost column.

These and other processing variations will be appreciated by those skilled in the art in order to obtain the results illustrated in FIG. 7 providing an expanded view of a selected calendar entry.

As described in connection with the techniques herein, in response to selection of a calendar entry, an expanded view of the calendar entry is displayed. The expansion of the calendar entry for the selected date causes compression of other remaining calendar entries corresponding to other dates. In one embodiment, these remaining calendar entries may be compressed in the horizontal and/or vertical directions so that entries of a same row have a same height or resulting vertical spacing and entries of a same column have a width or resulting horizontal spacing.

Figure 8:
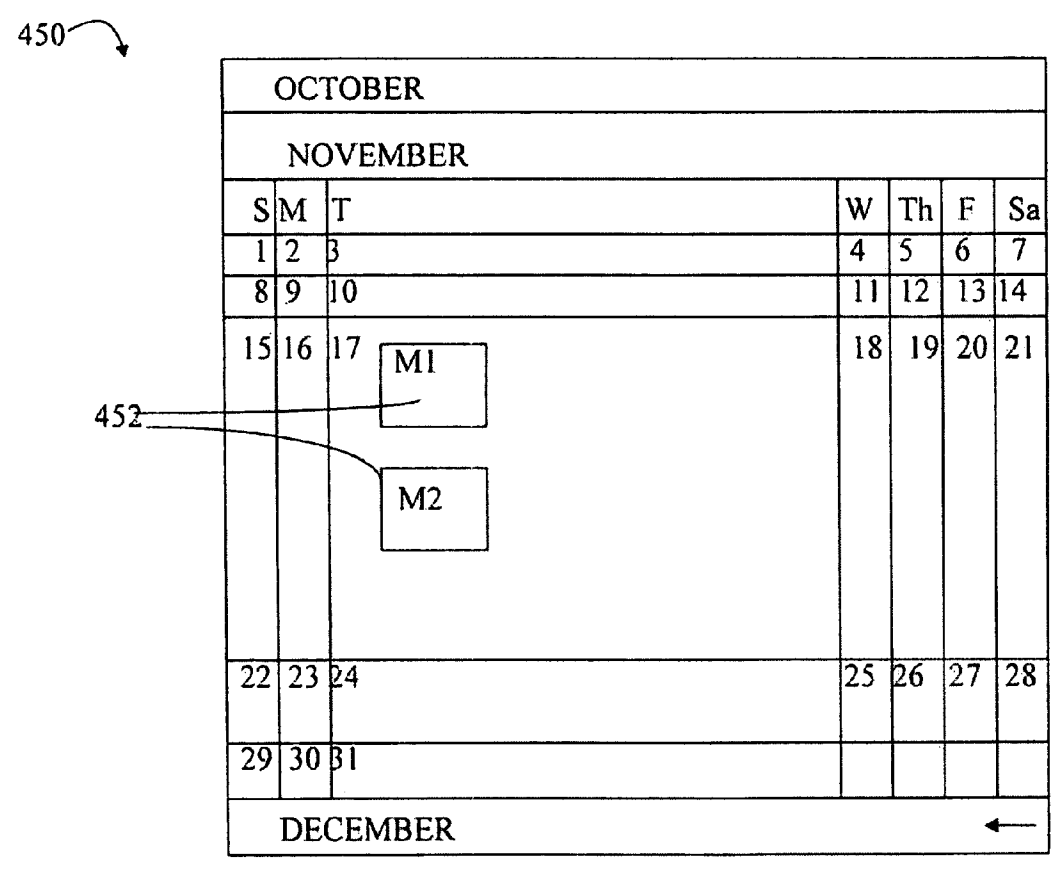

Referring now to FIG. 8, shown is an example of how messages may appear in the expanded calendar entry in one embodiment. The example 450 includes two messages denoted by element 452. These messages may have been previously associated with the selected calendar entry of November 17$^{th}$, for example, by dragging and dropping the messages from the message area into the November 17$^{th}$ entry. Each of the messages may have a corresponding icon included in the associated calendar entry as illustrated by 452. It should be noted that FIGS. 8 and 9A-9F include only the calendar portion of a display for purposes of illustration of the techniques herein.

In connection with a selected calendar entry, a display may be updated by expanding and compressing calendar entries in accordance with one of two modes of granularity—per calendar entry or within a calendar entry. In the first mode, per calendar entry, the display may be updated to include the expanded view for a selected calendar entry when a new calendar entry is selected. In this first mode, screen selections or movement within a single currently selected calendar entry do not cause further expansion and/or compression of calendar entries. Subsequent expansion and compression is performed only in response to a change in calendar entry. In contrast, in the second latter mode, screen selections or movement within a currently selected calendar entry result in expansion and/or compression of calendar entries. In this second mode, a finer granularity is used in connection with controlling the expansion and compression of displayed calendar entries. In response to screen position changes within a currently selected calendar entry when in the second granularity mode, the display may be updated to expand and/or compress one or more neighboring calendar entries. As described in detail below, the effect on neighboring calendar entries may be determined in accordance with the relative change in position in the horizontal and/or vertical directions within a selected calendar entry.

Referring now to FIG. 9A, shown is an example of an expanded view for the calendar entry of November $17^{th}$. In the example 500, let X1 represent a current screen position. Subsequently, a user updates a current screen position, such as using a touchscreen display, by sliding along the horizontal line to the point denoted by X2. In connection with the techniques herein when in the second mode of granularity for updating the display in response to movements within a selected calendar entry, as movement advances from X1 to X2, the calendar entry for November $17^{th}$ is compressed while the entry for November $18^{th}$ accordingly expands. The amount of compression and expansion of the foregoing entries may be in accordance with the amount of positional change from X1 to X2. In one embodiment, the entry for November $17^{th}$ may be maximally expanded when in position X1. Movement within the entry for November $17^{th}$ to any other position may result in compression of November $17^{th}$ entry and expansion of one or more neighboring entries in accordance with the direction and amount of movement. Movement along a horizontal axis toward a neighboring entry may result in expansion of the neighboring entry while accordingly compressing the currently selected entry of November $17^{th}$. Movement along a vertical axis toward a neighboring entry may also similarly result in expansion of the neighboring entry while the currently selected entry is accordingly compressed. Movement in a position and direction within one of the four quadrants (A1-A4) rather than in a strictly horizontal or vertical direction along one of the axis illustrated in 500 may result in expansion of more than one neighboring calendar entry touching the effected quadrant boundary. For example, in one embodiment, movement from X1 to a new position in the A2 quadrant may cause expansion of entries for November $10^{th}$ and $18^{th}$ in accordance with the new position.

Referring now to FIG. 9B, the example 550 illustrates an updated screen display in response to movement from X1 to X2 of FIG. 9A. Element 552 illustrates the boundaries associated with calendar entries when the current position within the November $17^{th}$ entry is X1. As the current position advances from X1 to X2, the calendar entry for November $18^{th}$ is expanded as illustrated by the arrow. In one embodiment, when in position X2, the calendar entry November $18^{th}$ may be expanded as illustrated by 554.

In connection with FIG. 9B, it should be noted that an embodiment may also choose to further extend line 554 to impact calendar entries bordering on the selected calendar entry of November 17. For example, as a variation to that illustrated in FIG. 9B, an embodiment may extend line 554 to also apply to the entry above and below the November $17^{th}$ entry causing a repartitioning of calendar entries for November $10^{th}$ and $11^{th}$, and November $24^{th}$ and $25^{th}$ as well. In a further variation, an embodiment may extend line 554 so as to also apply to all calendar entries in the Tuesday/Wednesday columns (e.g., causing repartitioning of November $3^{rd}/4^{th}$, $10^{th}/11^{th}$ $24^{th}/25^{th}$, and $31^{st}$).

Referring now to FIG. 9C, shown is an example of an expanded view for the calendar entry of November $17^{th}$. In the example 600, let X1 represent a current screen position. Subsequently, a user updates a current screen position, such as using a touchscreen display, by sliding downward along the vertical line to the point denoted by X2. In connection with the techniques herein when in the second mode of granularity for updating the display in response to movements within a selected calendar entry, as movement advances from X1 to X2, the calendar entry for November $17^{th}$ is compressed while the entry for November $24^{th}$ accordingly expands. The amount of compression and expansion of the foregoing entries may be in accordance with the amount of positional change from X1 to X2.

Referring now to FIG. 9D, the example 650 illustrates an updated screen display in response to movement from X1 to X2 of FIG. 9C. Element 652 illustrates the boundaries associated with calendar entries when the current position within the November $17^{th}$ entry is X1. As the current position advances from X1 to X2, the calendar entry for November $24^{th}$ is expanded as illustrated by the arrow. In one embodiment, when in position X2, the calendar entry November $24^{th}$ may be expanded as illustrated by 654.

In connection with FIG. 9D, it should be noted that an embodiment may also choose to further extend line 654 to impact calendar entries bordering on the selected calendar entry of November 17. For example, as a variation to that illustrated in FIG. 9D, an embodiment may extend line 654 to also apply to the entries to the left and right of the November $17^{th}$ entry causing a repartitioning of calendar entries for November $16^{th}$ and $23^{rd}$, and November $18^{th}$ and $25^{th}$ as well. In a further variation, an embodiment may extend line 654 so as to also apply to all calendar entries in the same row as November $17^{th}$ (e.g., causing repartitioning of November $15^{th}/22^{nd}$ $16^{th}/23^{rd}$, $18^{th}/25^{th}$, $19^{th}/26^{th}$, $20^{th}/27^{th}$, and $21^{st}/28^{th}$).

Referring now to FIG. 9E, shown is an example of an expanded view for the calendar entry of November $17^{th}$. In the example 700, let X1 represent a current screen position. Subsequently, a user updates a current screen position, such as using a touchscreen display, by sliding at an angle into the lower right quadrant toward the point denoted by X2. In connection with the techniques herein when in the second mode of granularity for updating the display in response to movements within a selected calendar entry, as movement advances from X1 to X2, the calendar entry for November $17^{th}$ is compressed in both the horizontal and vertical directions while the entries for November $18^{th}$ and $24^{th}$ accordingly expand. The amount of compression and expansion of the foregoing entries for the $18^{th}$ and $24^{th}$ may be in accordance with the amount of positional change from X1 to X2.

Figure 9F:
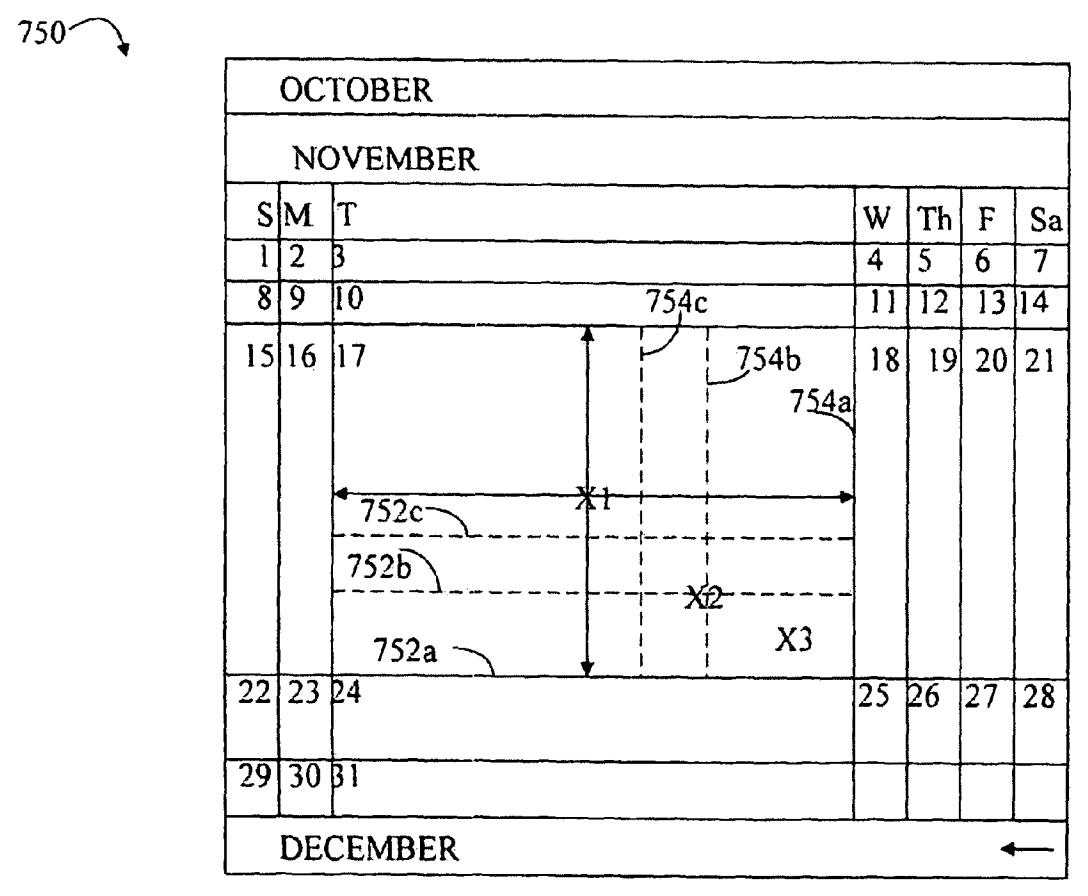

Referring now to FIG. 9F, the example 750 illustrates an updated screen display in response to movement from X1 to X2 of FIG. 9E. Elements 752a and 754a illustrate the boundaries associated with calendar entries when the current position within the November $17^{th}$ entry is X1. As the current position advances from X1 to X2, the calendar entries for November $18^{th}$ and $24^{th}$ are expanded as the entry for November $17^{th}$ is accordingly compressed. In one embodiment, when in position X2, the calendar entries may be delineated as represented by lines 752b and 754b. As the current position is further moved from X2 to X3, the calendar entries may be delineated as represented by 754c and 752c causing further expansion of entries for November $18^{th}$ and $24^{th}$ and further compression of the entry for November $17^{th}$.

In connection with FIG. 9F in a manner similar to as described above in connection with FIGS. 9B and 9D, it should be noted that an embodiment may also choose to further extend repartitioning of calendar entries to impact calendar entries bordering on the selected calendar entry of November 17. For example, as a variation to that illustrated in FIG. 9F in connection with movement to position X2, an embodiment may extend lines 754b and 752b to also apply to the entries above, below, to the left and to the right of the November $17^{th}$ entry causing a repartitioning of calendar entries, respectively, for November $10^{th}/11^{th}$, November $24^{th}/25^{th}$ $16^{th}/23^{rd}$, and $18^{th}/25^{th}$ as well. In a further variation, an embodiment may extend line 754b and 752b so as to also apply to all calendar entries in the Tuesday/Wednesday columns (e.g., causing repartitioning of November $3^{rd}/4^{th}$, $10^{th}/11^{th}$, $24^{th}/25^{th}$, and $31^{st}$), and in the same row as November $17^{th}$ (e.g., causing repartitioning of November $15^{th}/22^{nd}$ $16^{th}/23^{rd}$, $18^{th}/25^{th}$, $19^{th}/26^{th}$, $20^{th}/27^{th}$, and $21^{st}/28^{th}$).

The foregoing illustrates exemplary compression and expansion rates that may be used in one embodiment. It should be noted that other rates may be selected for use in an embodiment. The amount or rate of expansion and/or compression of entries may be at a uniform rate throughout each calendar entry, or may be at varying rates dependent on location within a calendar entry. In an embodiment, each calendar entry may have a minimal size below which an entry is not compressed. It will be appreciated by those skilled in the art that the rate of compression/expansion may be made determined in accordance with the change in location within a selected calendar entry. The change in location may be determined by tracking a current screen location in comparison to a previous screen location. The corresponding calendar entry may be determined by tracking which screen portions correspond or map to which calendar entries.

If a user selects a new calendar entry, the processing described herein may be performed with respect to the new calendar entry. In one embodiment, when a new calendar entry is initially selected, the expanded view as illustrated, for example, in FIG. 7 may result. The current position within the selected entry may be initially set at the point indicated X1.

Figure 10:
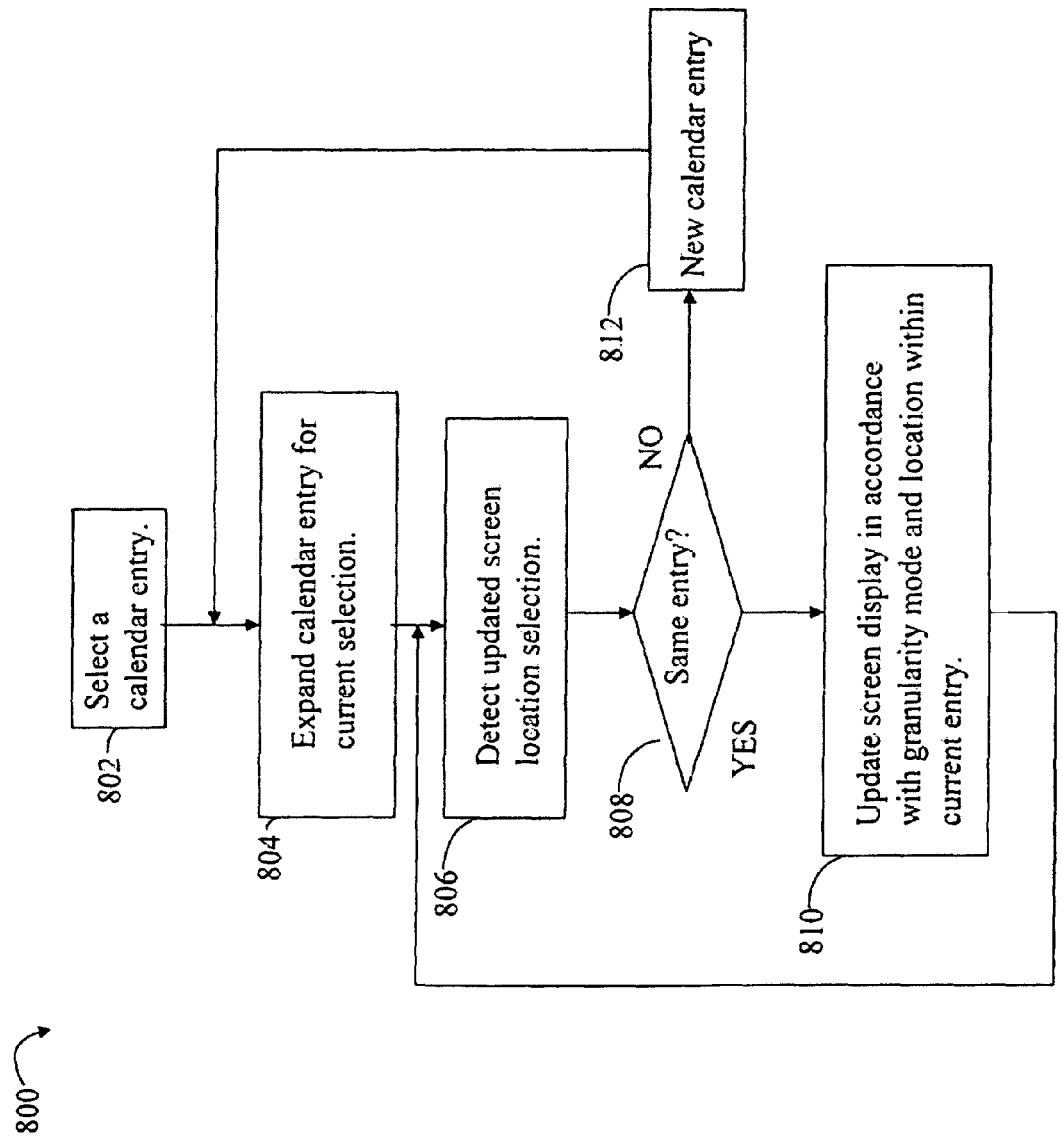
FIG. 10 is a flowchart of processing steps that may be performed in an embodiment in connection with the techniques described herein.

Referring now to FIG. 10, shown is an example of a flowchart of processing steps that may be performed in connection with an embodiment utilizing the techniques herein. The processing steps of 800 summarize processing just described in connection with preceding figures. At step 802, a calendar entry is selected. As described herein, a calendar entry may be designated by directly selecting the date for the calendar entry when the calendar is in expanded or compressed view. Alternatively, a calendar entry may be selected by dragging and dropping a message on the calendar entry.

At step 804, in response to selecting the calendar entry of step 802, the screen is updated by expanding the calendar entry. The initial expansion of a selected calendar entry is illustrated, for example, in connection with FIG. 7.

At step 806, an updated screen location selection is detected. This selection may be made, for example, by a user making a selection of a screen location using touchscreen or other input device. The selection of a screen location, as well as other user selections, may be reported as an event to the calendar and messaging component described elsewhere herein. In response, processing may be performed to update the screen. At step 808, a determination may be made as to whether the updated screen location selection is within the same calendar entry. If not, control proceeds to step 812 for processing for a new calendar entry. Control proceeds to step 804 to expand the newly selected calendar entry. If step 808 evaluates to yes, then control proceeds to step 810 to update the screen display in accordance with the granularity mode and updated screen location. As described elsewhere herein, if the current granularity mode is per entry, then there is no processing performed with respect to expansion and/or compression of the current entry and one or more other neighboring entries. If the granularity mode is within a calendar entry, the display is updated in response to movements within a currently selected calendar entry causing expansion and/or compression of the current entry and any appropriate neighboring entries.

It should be noted that although the techniques for expansion of a selected calendar entry are illustrated herein as integrated with messaging, an embodiment may include the calendar information, such as scheduled appointments, without messaging. For example, an embodiment may include a component which includes only appointment scheduling functionality as may be associated with an electronic calendar program.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for displaying messages within a message board area of a display area comprising a calendar area, a menu area, and the message board area, the method executed at least in part via a processing unit of a computer having memory whereon computer executable instructions comprising the method are stored, the method comprising:
   presenting, within the menu area, a first user designation, a second user designation, and a third user designation;
   receiving a selection of the first user designation and the second user designation;
   displaying a first message associated with the first user designation and a second message associated with the second user designation within the message board area in response to the receiving, but not displaying a third message associated with the third user designation within the message board area; and
   placing the first message into a selected calendar entry within the calendar area in response to a selection of the first message.

2. The method of claim 1, comprising:
   automatically enlarging an area of the selected calendar entry in response to the placing; and
   adjusting one or more calendar entries so that at least one calendar entry comprised in a same row as the selected calendar entry has a same vertical height as the selected calendar entry and at least one calendar entry comprised in a same column as the selected calendar entry has a same horizontal width as the selected calendar entry.

3. The method of claim 1, comprising:
   receiving movement data corresponding to a positional change in at least one of a horizontal direction or a vertical direction within the selected calendar entry towards a neighboring calendar entry; and
   in response to the receiving movement data,
      reducing an area of the selected calendar entry, and
      concurrently increasing an area of the neighboring calendar entry.

4. The method of claim 1, comprising:
receiving movement data corresponding to a positional change in a horizontal direction and a vertical direction within the selected calendar entry;
adjusting a horizontal width and a vertical height of the selected calendar entry in accordance with the movement data; and
adjusting a horizontal width and a vertical height of a second calendar entry neighboring the selected calendar entry in accordance with the movement data.

5. The method of claim 1, comprising:
receiving movement data corresponding to a positional change in at least one of a horizontal direction or a vertical direction within the selected calendar entry towards a neighboring calendar entry;
increasing at least one of a horizontal width or a vertical height of the neighboring calendar entry in accordance with the movement data; and
reducing at least one of a horizontal width or a vertical height of the selected calendar entry in accordance with the movement data.

6. The method of claim 1, comprising:
receiving movement data corresponding to a positional change in a horizontal direction and a vertical direction within the selected calendar entry towards a neighboring calendar entry;
increasing at least one of a horizontal width or a vertical height of the neighboring calendar entry in accordance with the movement data; and
reducing a horizontal width and a vertical height of the selected calendar entry in accordance with the movement data.

7. The method of claim 1, the selected calendar entry having a larger area than an area of a neighboring calendar entry upon the placing.

8. The method of claim 1, comprising
receiving movement data; and
adjusting a size of some, but not all, displayed calendar entries in response to the movement data.

9. The method of claim 8, comprising adjusting a size of some, but not all, of the displayed calendar entries without displaying additional calendar entries.

10. A computer readable memory comprising computer executable instructions that when executed perform a method for displaying messages within a message board area of a display area comprising a calendar area, a menu area, and the message board area, the method comprising:
presenting, within the menu area, a first user designation, a second user designation, and a third user designation;
receiving a selection of the first user designation and the second user designation;
displaying a first message associated with the first user designation and a second message associated with the second user designation within the message board area in response to the receiving, but not displaying a third message associated with the third user designation within the message board area; and
placing the first message into a selected calendar entry within the calendar area in response to a selection of the first message.

11. The computer readable memory of claim 10, the selection of the first message comprising a dragging and dropping of the first message into the calendar area.

12. The computer readable memory of claim 10, comprising:
increasing an area of the selected calendar entry in response to the placing.

13. The computer readable memory of claim 10, comprising:
displaying a fourth message associated with the first user designation and a fifth message associated with the second user designation within the message board area in response to the receiving.

14. The computer readable memory of claim 10, the message board area not comprising a calendar implementation.

15. A system, comprising:
one or more processing units; and
memory comprising instructions that when executed by at least some of the one or more processing units perform a method for displaying messages within a message board area of a display area comprising a calendar area, a menu area, and the message board area, the method comprising:
presenting, within the menu area, a first user designation, a second user designation, and a third user designation;
receiving a selection of the first user designation and the second user designation;
displaying a first message associated with the first user designation and a second message associated with the second user designation within the message board area in response to the receiving, but not displaying a third message associated with the third user designation within the message board area; and
placing the first message into a selected calendar entry within the calendar area in response to a selection of the first message.

16. The system of claim 15, the method comprising:
automatically enlarging an area of the selected calendar entry in response to the placing.

17. The system of claim 15, the selection of the first message comprising a dragging and dropping of the first message into the calendar area.

18. The system of claim 15, the method comprising:
receiving movement data corresponding to a positional change in at least one of a horizontal direction or a vertical direction within the selected calendar entry towards a neighboring calendar entry; and
in response to the receiving movement data,
reducing an area of the selected calendar entry, and
concurrently increasing an area of the neighboring calendar entry.

19. The system of claim 15, the method comprising:
receiving movement data corresponding to a positional change in a horizontal direction and a vertical direction within the selected calendar entry;
adjusting a horizontal width and a vertical height of the selected calendar entry in accordance with the movement data; and
adjusting a horizontal width and a vertical height of a second calendar entry neighboring the selected calendar entry in accordance with the movement data.

20. The system of claim 15, the third message not displayed within the message board area because the receiving did not comprise a selection of the third user designation.

* * * * *